US012381325B2

(12) United States Patent
Sundararajan et al.

(10) Patent No.: US 12,381,325 B2
(45) **Date of Patent: *Aug. 5, 2025**

(54) ANTENNA RADIATOR WITH PRE-CONFIGURED CLOAKING TO ENABLE DENSE PLACEMENT OF RADIATORS OF MULTIPLE BANDS

(71) Applicant: John Mezzalingua Associates, LLC, Liverpool, NY (US)

(72) Inventors: Niranjan Sundararajan, Clay, NY (US); Charles Buondelmonte, Baldwinsville, NY (US); Jay Zhu, Baldwinsville, NY (US); Wengang Chen, Liverpool, NY (US)

(73) Assignee: John Mezzalingua Associates, LLC, Liverpool, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/618,212

(22) Filed: Mar. 27, 2024

(65) Prior Publication Data

US 2024/0313402 A1 Sep. 19, 2024

Related U.S. Application Data

(63) Continuation of application No. 17/980,595, filed on Nov. 4, 2022, now Pat. No. 11,967,777, which is a (Continued)

(51) Int. Cl.

*H01Q 5/48* (2015.01)
*H01Q 1/38* (2006.01)

(Continued)

(52) U.S. Cl.

CPC ................ *H01Q 5/48* (2015.01); *H01Q 1/38* (2013.01); *H01Q 5/314* (2015.01); *H01Q 21/062* (2013.01); *H01Q 1/246* (2013.01)

(58) Field of Classification Search

CPC ........... H01Q 5/48; H01Q 1/38; H01Q 5/314; H01Q 21/062; H01Q 1/246; H01Q 1/521; H01Q 15/006; H01Q 21/24; H01Q 5/42

See application file for complete search history.

(56) References Cited

U.S. PATENT DOCUMENTS 9,570,804 B2 2/2017 Shang et al.
9,698,486 B2 7/2017 Shooshtari et al.

(Continued)

FOREIGN PATENT DOCUMENTS

WO 2014100938 A1 7/2014
WO 2016081036 A1 5/2016

(Continued)

OTHER PUBLICATIONS

International Search Report and Written Opinion dated Apr. 28, 2021, from International Application No. PCT/US2021/012420, 19 pages.

(Continued)

*Primary Examiner* — David E Lotter
(74) *Attorney, Agent, or Firm* — Meunier Carlin & Curfman LLC

(57) ABSTRACT

An antenna that enables dense packing of radiators includes a plurality of first radiators configured to radiate in a first frequency band and a plurality of second radiators configured to radiate in a second frequency band, the second frequency band having higher frequencies than the first frequency band. each of the plurality of first radiators includes a plurality of dipole arms. Each of the plurality of dipole arms includes a periodic pattern of inductive choke segments, and each of the dipole arms has a broken peripheral current path.

8 Claims, 13 Drawing Sheets

Related U.S. Application Data continuation of application No. 17/143,405, filed on Jan. 7, 2021, now Pat. No. 11,522,289.

(60) Provisional application No. 63/025,659, filed on May 15, 2020.

(51) Int. Cl.

| | |
|---|---|
| ***H01Q 5/314*** | (2015.01) |
| ***H01Q 21/06*** | (2006.01) |
| *H01Q 1/24* | (2006.01) |

(56) References Cited

U.S. PATENT DOCUMENTS

| | | | | |
|---|---|---|---|---|
| 9,711,871 | B2 | 7/2017 | Jones | |
| 9,819,084 | B2 | 11/2017 | Zimmerman et al. | |
| 9,831,548 | B2 | 11/2017 | Timofeev et al. | |
| 10,439,285 | B2 | 10/2019 | Isik et al. | |
| 10,547,110 | B1 | 1/2020 | Isik et al. | |
| 10,601,120 | B2 | 3/2020 | Bisiules et al. | |
| 10,644,401 | B2 | 5/2020 | Shang et al. | |
| 2010/0171675 | A1* | 7/2010 | Borja | H01Q 21/24 343/797 |
| 2015/0214617 | A1 | 7/2015 | Shang et al. | |
| 2016/0111782 | A1 | 4/2016 | Alu et al. | |
| 2018/0138595 | A1 | 5/2018 | Nysen et al. | |
| 2018/0323513 | A1 | 11/2018 | Varnoosfaderani et al. | |
| 2019/0190127 | A1 | 6/2019 | Bryce | |
| 2020/0028244 | A1 | 1/2020 | Hu et al. | |
| 2020/0067179 | A1* | 2/2020 | Urcia | H01Q 21/061 |
| 2020/0067197 | A1* | 2/2020 | Tang | H01Q 9/285 |
| 2020/0161748 | A1 | 5/2020 | Isik et al. | |
| 2020/0321700 | A1 | 10/2020 | Wu et al. | |
| 2020/0335881 | A1 | 10/2020 | Le | |
| 2022/0190487 | A1* | 6/2022 | Sun | H01Q 21/08 |
| 2023/0017375 | A1* | 1/2023 | Wu | H01Q 5/42 |

FOREIGN PATENT DOCUMENTS

| | | | |
|---|---|---|---|
| WO | 2017176386 | A1 | 10/2017 |
| WO | 2017177091 | A1 | 10/2017 |
| WO | 2019009951 | A1 | 1/2019 |
| WO | 2019070947 | A | 4/2019 |

OTHER PUBLICATIONS

Extended European Search Report, dated May 24, 2024, from European Application No. 21803177.1, 12 pages.

Soric, et al., "Dual-Polarized Reduction of Dipole Antenna Blockage Using Mantle Cloaks", IEEE Trans on Antenn and Propag., vol. 63, No. 11, Nov. 1, 2015 (Nov. 1, 2015), pp. 4827-4834, XP011588818, ISSN: 0018-926X, DOI: 10.1109/TAP.2015.2476468.

* cited by examiner

SECTION A-A

All dimensions are in inches

ANTENNA RADIATOR WITH PRE-CONFIGURED CLOAKING TO ENABLE DENSE PLACEMENT OF RADIATORS OF MULTIPLE BANDS

This application is a continuation of U.S. patent application Ser. No. 17/980,595, filed Nov. 4, 2022, which is a continuation of U.S. patent application Ser. No. 17/143,405, filed Jan. 7, 2021, which claims priority to U.S. Provisional Patent Application Ser. No. 63/025,659, filed May 15, 2020, which applications are hereby incorporated by this reference in their entireties as if fully set forth herein.

BACKGROUND OF THE INVENTION

Field of the Invention

The present invention relates to wireless communications, and more particularly, to compact multiband antennas.

Related Art

The introduction of additional spectrum for cellular communications, such as the C-Band frequencies and Citizens Broadband Radio Service (CBRS) bands, opens up vast resources of additional capacity for existing cellular customers as well as new User Equipment (UE) types. New UE types include Internet of Things (IoT) devices, drones, and self-driving vehicles. Further, the advent of CBRS (or C-Band, which encompasses the CBRS channels) enables a whole new cellular communication paradigm in private networks.

Accommodating CBRS in existing LTE and 5G cellular networks requires enhancing antennas to operate in 3550-3700 MHZ, in addition to LTE low band (LB) and (now mid) bands (MB) in the range of 700 MHz and 2.3 GHZ, respectively. A challenge arises in integrating C-Band or CBRS radiators into antennas designed to operate in the existing lower bands in that energy radiated by the C-Band radiators may cause resonances in the lower band radiators. A particular problem may arise in the low band radiators that are in close proximity to the C-Band radiators whereby the low band radiators may significantly degrade the performance of the antenna in the C-Band band. The same is true for low band radiators that are in close proximity to mid band radiators, whereby energy emitted by the mid band radiators causes resonance in the low band radiators, which subsequently re-radiates to interfere with the mid band radiators radiation patterns.

A conventional solution is to increase the area of the array face to accommodate additional radiators and avoid re-radiation and other forms of interference. This is generally not practical because increasing the area of the antenna exacerbates wind loading, which can have severe consequences with multiple antennas deployed on tall cell towers. Further, given limited space availability on a given cell tower, or in a typical urban deployment, it is generally not feasible to simply increase the size of the antenna.

Accordingly, what is needed is a low band radiator design that prevents re-radiation in the mid band and CBRS bands, thus enabling the low band radiators to be placed in close proximity to the mid band and CBRS radiators, thereby enabling the packing of radiators of multiple bands into a smaller antenna array face.

SUMMARY OF THE INVENTION

An aspect of the present invention involves an antenna. The antenna comprises a plurality of first radiators configured to radiate in a first frequency, and a plurality of second radiators configured to radiate in a second frequency that has higher frequency band having higher frequencies than the first frequency. Each of the plurality of first radiators includes a plurality of dipole arms, wherein each of the plurality of dipole arms includes a periodic pattern of inductive choke segments, and wherein each of the dipole arms has a broken peripheral current path.

Another aspect of the present invention involves an antenna. The antenna comprises a plurality of mid band radiators; a plurality of high band radiators; and a plurality of low band radiators, wherein the plurality of low band radiators includes a first subset of low band radiators that are in close proximity to one or more of the plurality of mid band radiators and a second subset of low band radiators that are in close proximity to one or more of the plurality of high band radiators, wherein each of the low band radiators includes a plurality of low band dipole arms, each of the low band dipole arms having a central conductor, a mantle disposed on an outer surface of the central conductor, and a conductive pattern disposed on an outer surface of the mantle, wherein the low band radiators in the first subset of low band radiators have a first conductive pattern, and the low band radiators in the second subset of low band radiators have a second conductive pattern, wherein the first conductive pattern is different from the second conductive pattern, wherein the first conductive pattern is configured to prevent a mid band re-radiation and the second conductive pattern is configured to prevent a high band re-radiation.

DESCRIPTION OF EXEMPLARY EMBODIMENTS

Figure 1A:
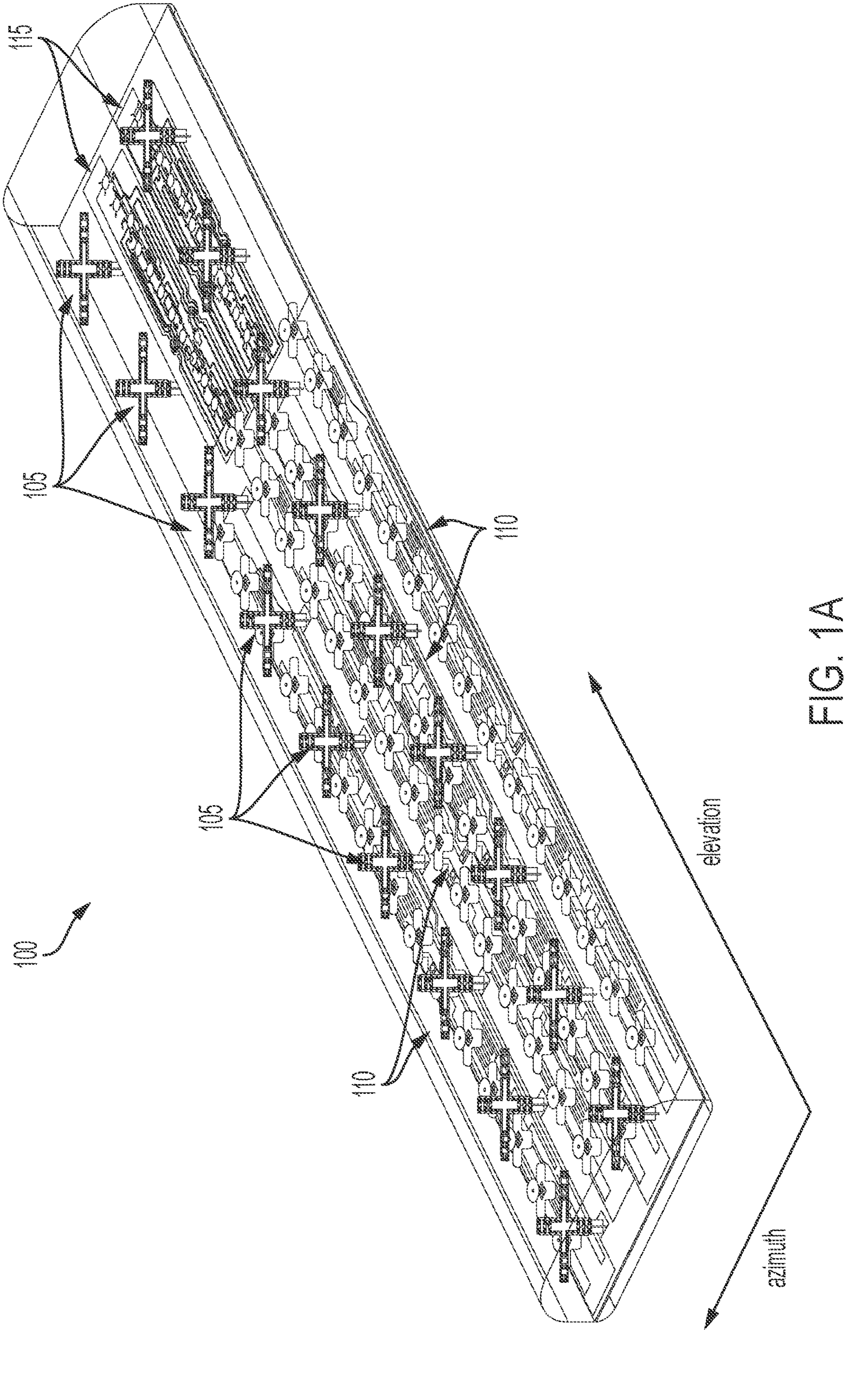
FIG. 1A illustrates a first exemplary antenna array face that includes a plurality of low band dipoles according to the disclosure.

FIG. 1A illustrates an exemplary array face 100 according to a first embodiment of the disclosure. Array face 100 has a plurality of low band radiators 105 (for example, 617-960 MHz) that are arranged in two columns along the elevation axis of the antenna; a plurality of mid band radiators 110 (for example, 1.695-2.7 GHZ) that are arranged in four columns and only extend for a portion of the antenna length along the elevation axis; and a plurality of C-Band radiators 115 (for example, 3.4-4.2 GHZ) (as used herein, the C-Band radiators may be referred to as high band radiators) that are arranged in two columns along a remaining length array face 100 along the elevation axis. Each of the low band radiators 105, mid band radiators 110, and C-Band radiators 115 comprise two orthogonal radiator arms, each of which radiate in a single polarization. Accordingly, each of the radiators illustrated may operate independently in two orthogonal polarizations ("dual polarized"), for example, in +/−45 degree orientations. Array face 100 may correspond to a 16 port antenna, in which the low band radiators 105 are given four ports: one per polarization per column; the mid band radiators 110 are given eight ports: one per polarization per column; and the C-Band radiators 115 are given four ports: one per polarization per column.

Figure 1B:
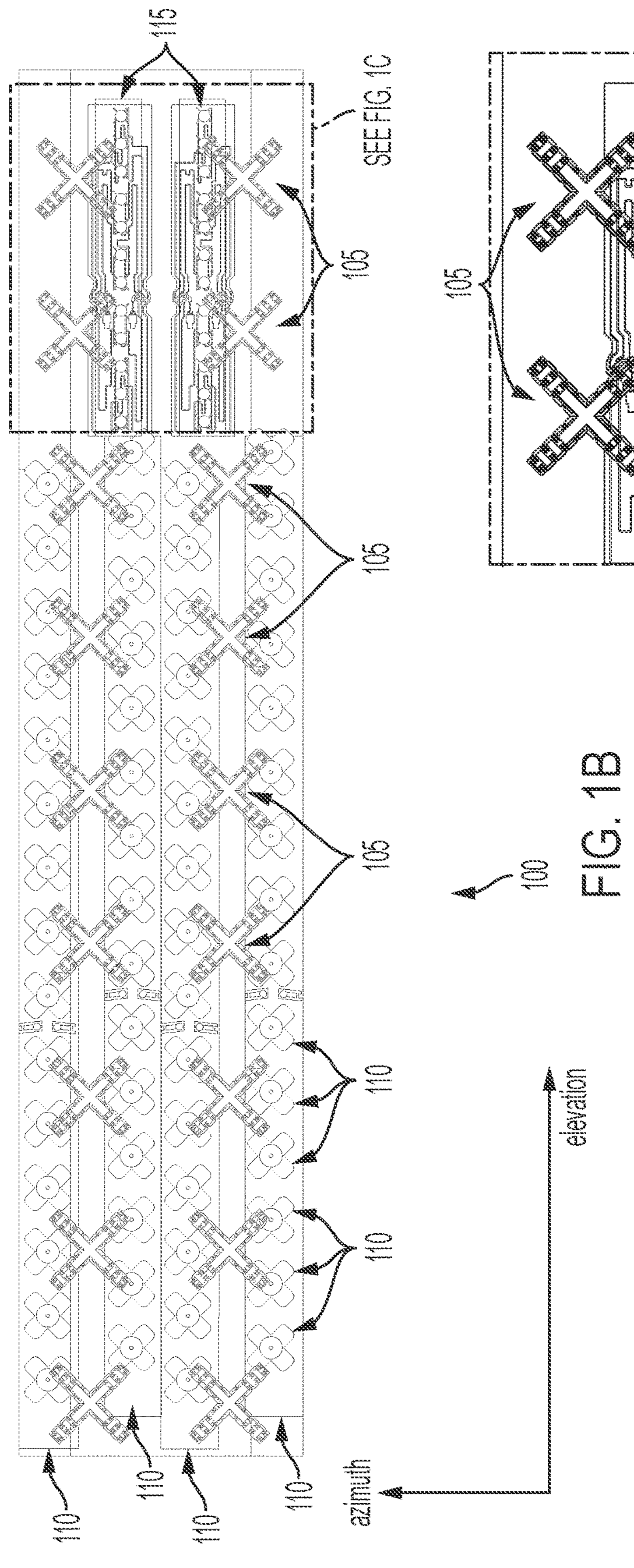
FIG. 1B is an overhead view of the array face of the exemplary antenna of FIG. 1A.
Figure 1C:
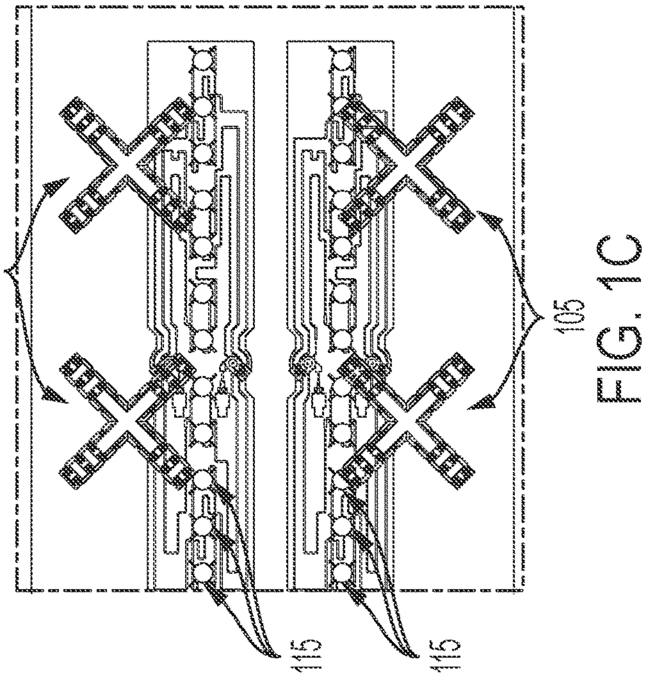
FIG. 1C illustrates a portion of the array face of FIG. 1B, focusing on the portion of the array face having two columns of C-Band radiators and low band radiators.

FIG. 1B is an overhead view of array face 100, providing further detail regarding the placement of low band radiators 105, mid band radiators 110, and C-Band radiators 115. And FIG. 1C is a close-up view of the illustration of FIG. 1B, focusing on the two columns of C-Band radiators 115 and the two columns of low band radiators 105 that are in close proximity thereto. It will be readily apparent that the low band radiators 105 are placed very close to mid band radiators 110 and C-Band radiators 115, respectively, such that RF emissions from the mid band radiators 110 and the C-Band radiators 115 would couple with non-cloaked or conventionally-cloaked low band radiators 105.

Figure 2:
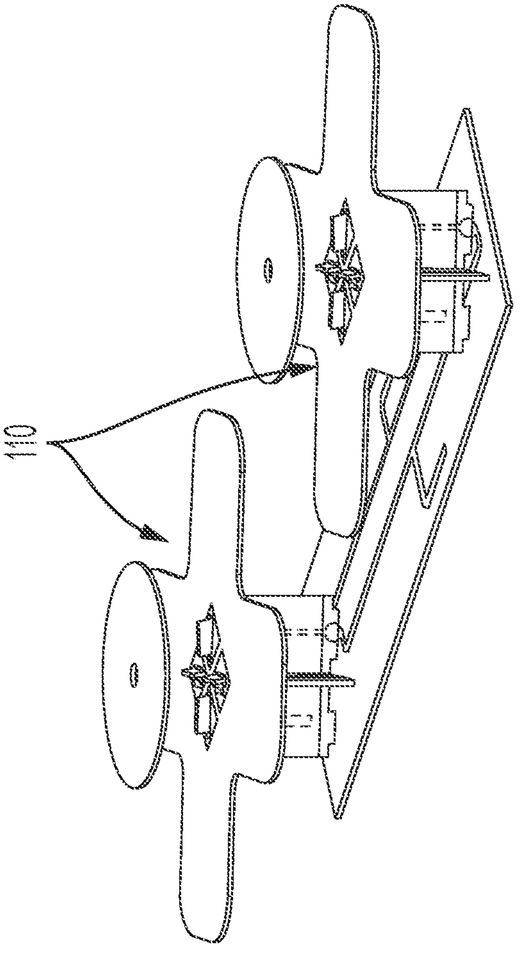
FIG. 2 illustrates two exemplary mid band radiators according to the disclosure.

FIG. 2 illustrates two exemplary mid band radiators 110 according to the disclosure. As illustrated, the mid band radiators 110 have two independent sets of dipoles that radiate in orthogonal polarization orientations, in this case +/−45 degrees.

Figure 3:
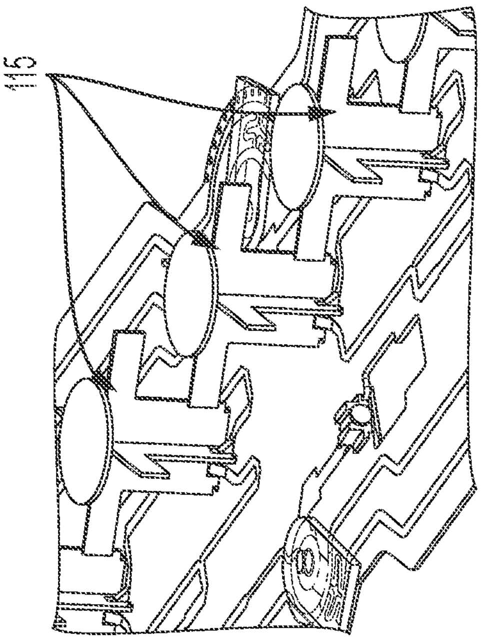
FIG. 3 illustrates three C-Band radiators according to the disclosure.

FIG. 3 illustrates a portion of one column of C-Band radiators 115 according to the disclosure. As with the mid band radiators 110, each of the C-Band radiators 115 has two independent sets of dipoles that radiate in orthogonal polarization orientations, in this case +/−45 degrees. It will be understood that the C-Band radiators 115 may operate in the CBRS channels.

Although the low band radiators 105, mid band radiators 110, and C-Band radiators 115 are described as radiating in +/−45 degrees orientations, it will be understood that each of the low band radiators 105, mid band radiators 110, and C-Band radiators 115 may be fed signals so that they radiate in a circular polarized fashion.

Figure 4:
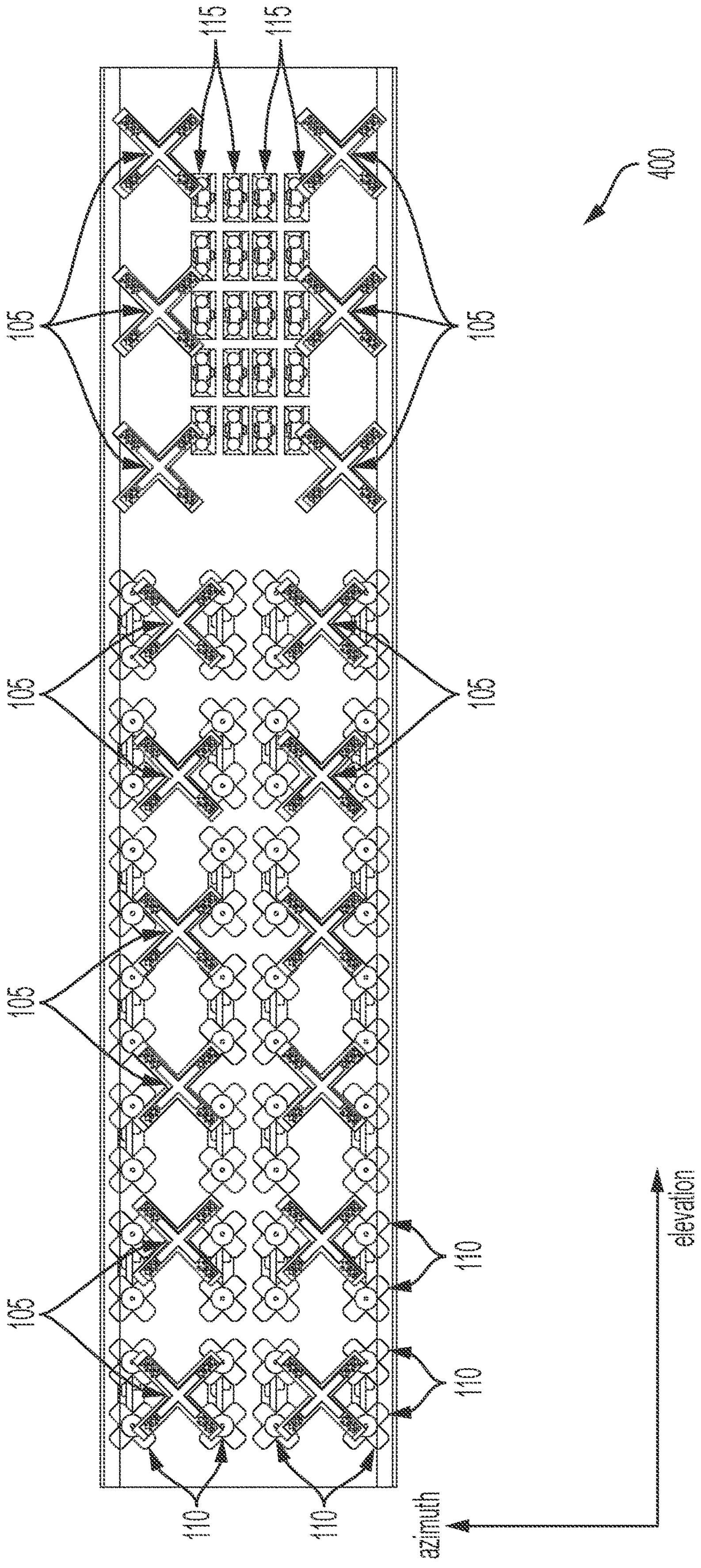
FIG. 4 illustrates a second exemplary array face, in which the C-Band radiators are arranged in four columns for beamforming.

FIG. 4 illustrates a second exemplary array face 400, in which the C-Band radiators 115 are arranged in four columns that are substantially 2/2 apart between them, which may accommodate C-Band beamforming. Array face 400 has two columns of low band radiators 105 and four columns of mid band radiators 110. As with array face 100, certain low band radiators 105 are in close proximity to and shadow the mid band radiators 110, and the remaining low band radiators 105 are in close proximity to and shadow at least some of the C-Band radiators 115. Accordingly, array face 400 may be deployed in a 20 port antenna.

A problem common to array faces 100 and 400, which would be endemic to any array face having conventional low band radiators in close proximity to mid band 110 or C-Band radiators 115, is that energy respectively radiated by the mid band radiators 110 and C-band radiators 115 imparts the flow of current within the dipoles of a conventional low band radiator that intersects the gain pattern of transmitting radiator 110/115. The current generated within the dipoles of the conventional low band radiator in turn re-radiates, thereby interfering with the gain pattern of the transmitting radiator 110/115. The use of cloaking in low band radiators is known. However, conventional cloaking can lead to two tradeoff factors: it may increase the complexity and cost of manufacturing the low band radiator; and the cloaking may not be equally effective across the bands of the transmitting radiators 110/115.

Figure 5A:
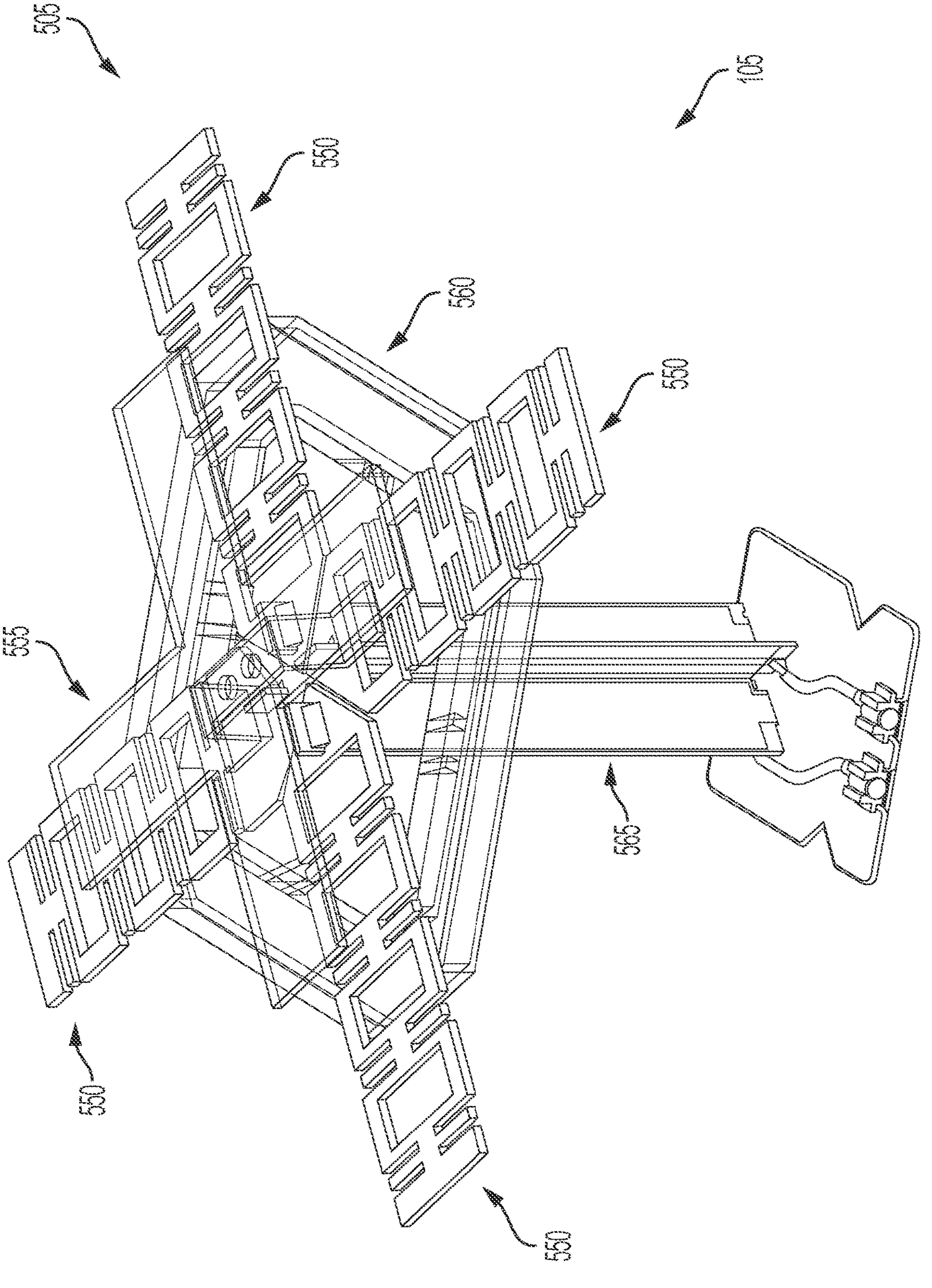
FIG. 5A illustrates a first exemplary low band radiator according to the disclosure.

FIG. 5A illustrates a low band radiator 505 that may be used is the low band radiators 105 for array faces 100 and 400. Low band radiator 505 has a plurality of dipoles 550 that are mechanically coupled to balun stem 565, which has feed lines that provide RF energy to—and receive RF energy from—dipoles 550. Low band radiator 505 may also have a passive radiator 555, which can be used to adjust the bandwidth of low band radiator 505 and adjust its directivity, and a passive support structure 560. The advantage of low band radiator 505 is that it is simple and easy to manufacture because dipoles 550 may be formed of a stamped sheet metal. Further, the design of dipoles provide a good compromise in ease of manufacture with good cloaking performance in both the mid band and C-Band.

Figure 5B:
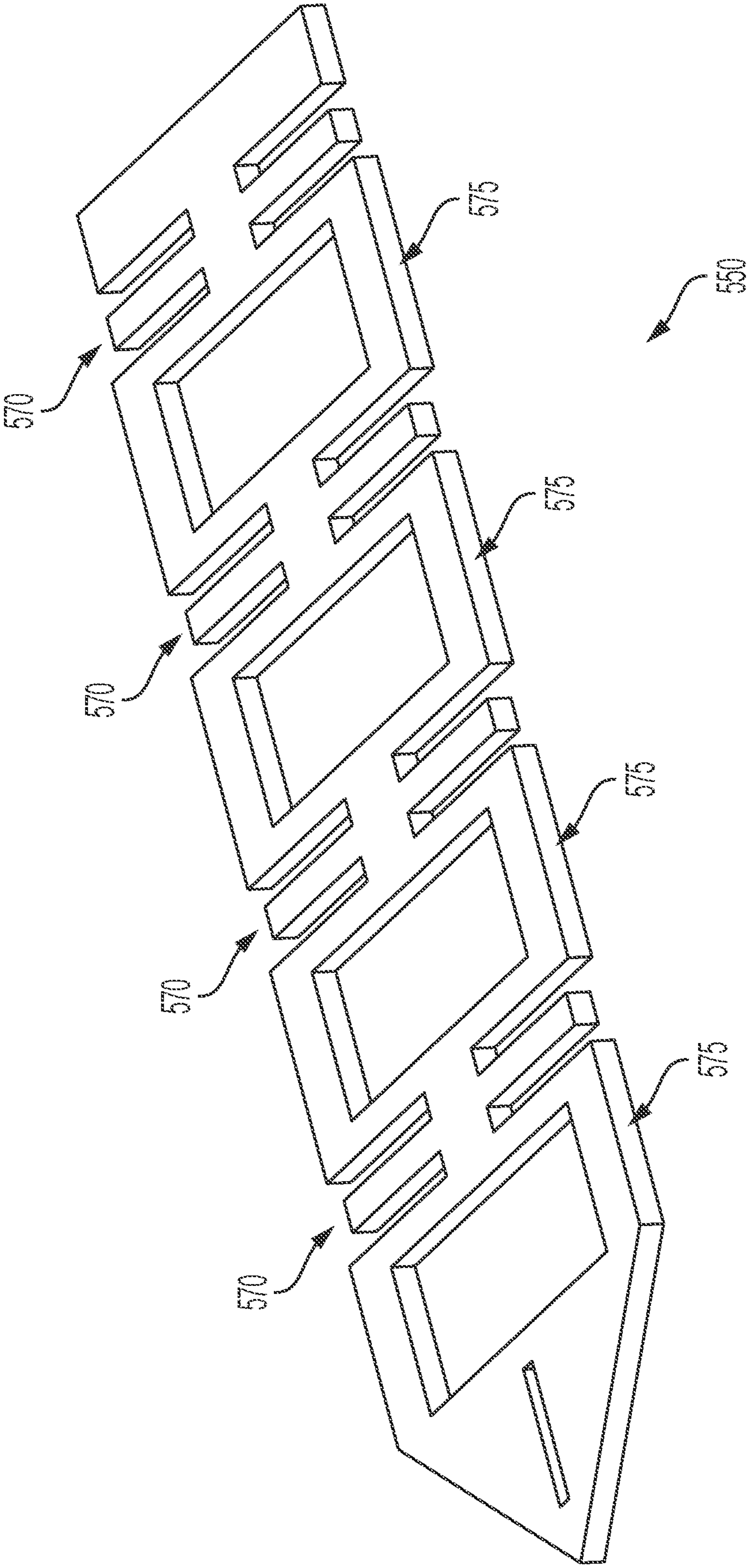
FIG. 5B illustrates a low band dipole arm of the first exemplary low band radiator of FIG. 5A.

FIG. 5B illustrates an exemplary dipole arm 550 of low band radiator 505. Dipole arm 550 has an alternating sequence of capacitive choke segments 575 and inductive choke segments 570. An important feature of dipole arm 550 is that it does not have a continuous conductive trace running along its length, but is interrupted by the alternation of capacitive choke segments 575 and inductive choke segments 570. Dipole arm 550 has a two dimensional structure, which may mean that it is defined by a pattern that may be stamped out of sheet metal or printed on a circuit board without layering of components (other than a printed trace on a circuit board). Dipole arm 550 may be stamped aluminum or brass, or may be implemented on a printed circuit board using FR4, for example. It will be understood that such variations are possible and within the scope of the disclosure.

Figure 5C:
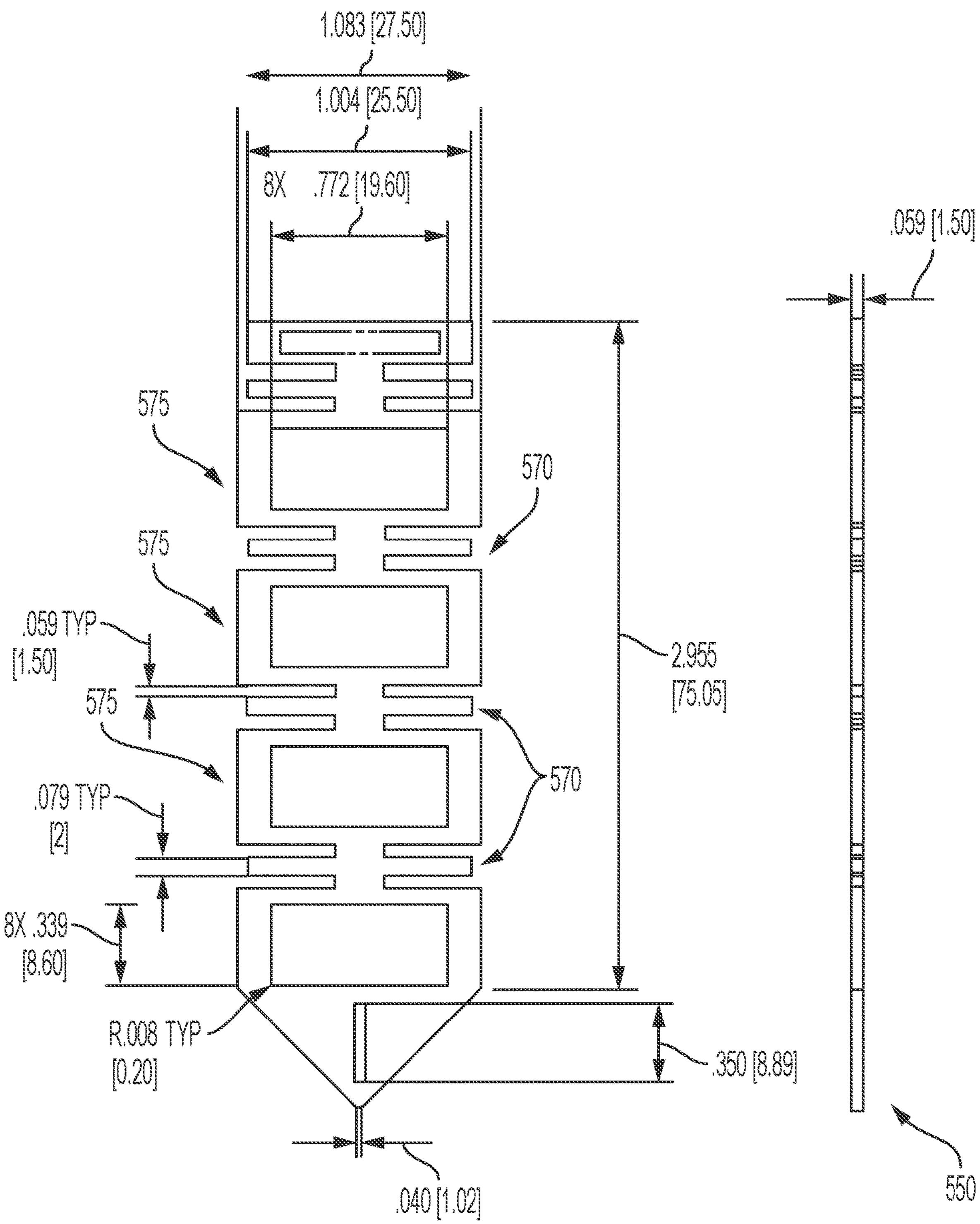
FIG. 5C is a drawing of the low band dipole arm of FIG. 5B, including example dimensions.

FIG. 5C provides example dimensions for dipole arm 550.

Figure 6A:
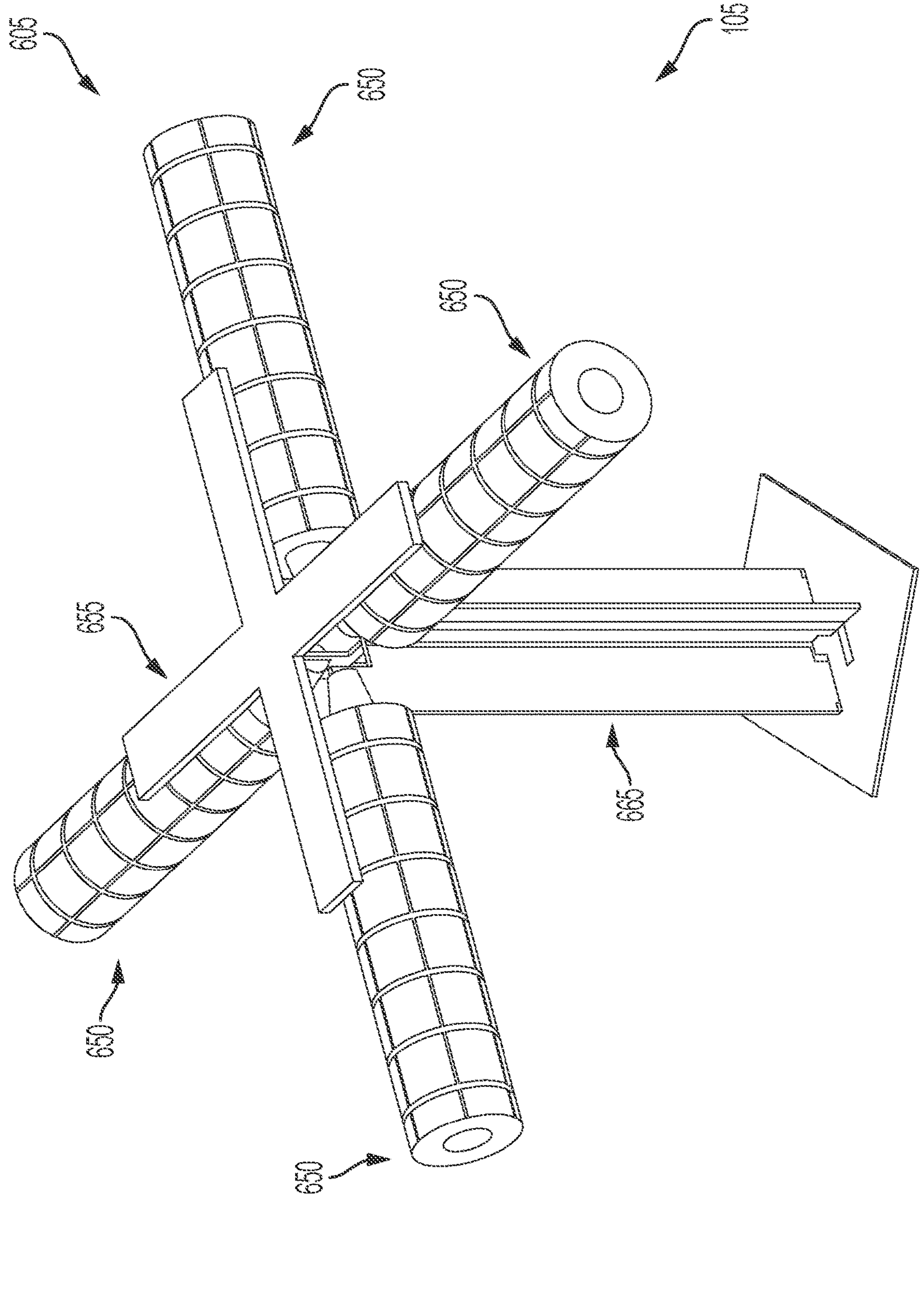
FIG. 6A illustrates a second exemplary low band radiator, which is configured for cloaking mid-band RF energy, according to the disclosure.

FIG. 6A illustrates an exemplary low band radiator 605, which may be used as a low band radiator 105 in array face 100/400 for those low band radiators 105 that are in close proximity to the mid band radiators 110. In other words, low band radiator 605 has cloaking structure that is optimized for preventing re-radiation in the mid band frequencies. Low band radiator 605 has a plurality of dipole arms 650, which are coupled to a balun stem 665, and may have a passive radiator 655, which can be used to adjust the bandwidth of low band radiator 605 and adjust its directivity.

Figure 6B:
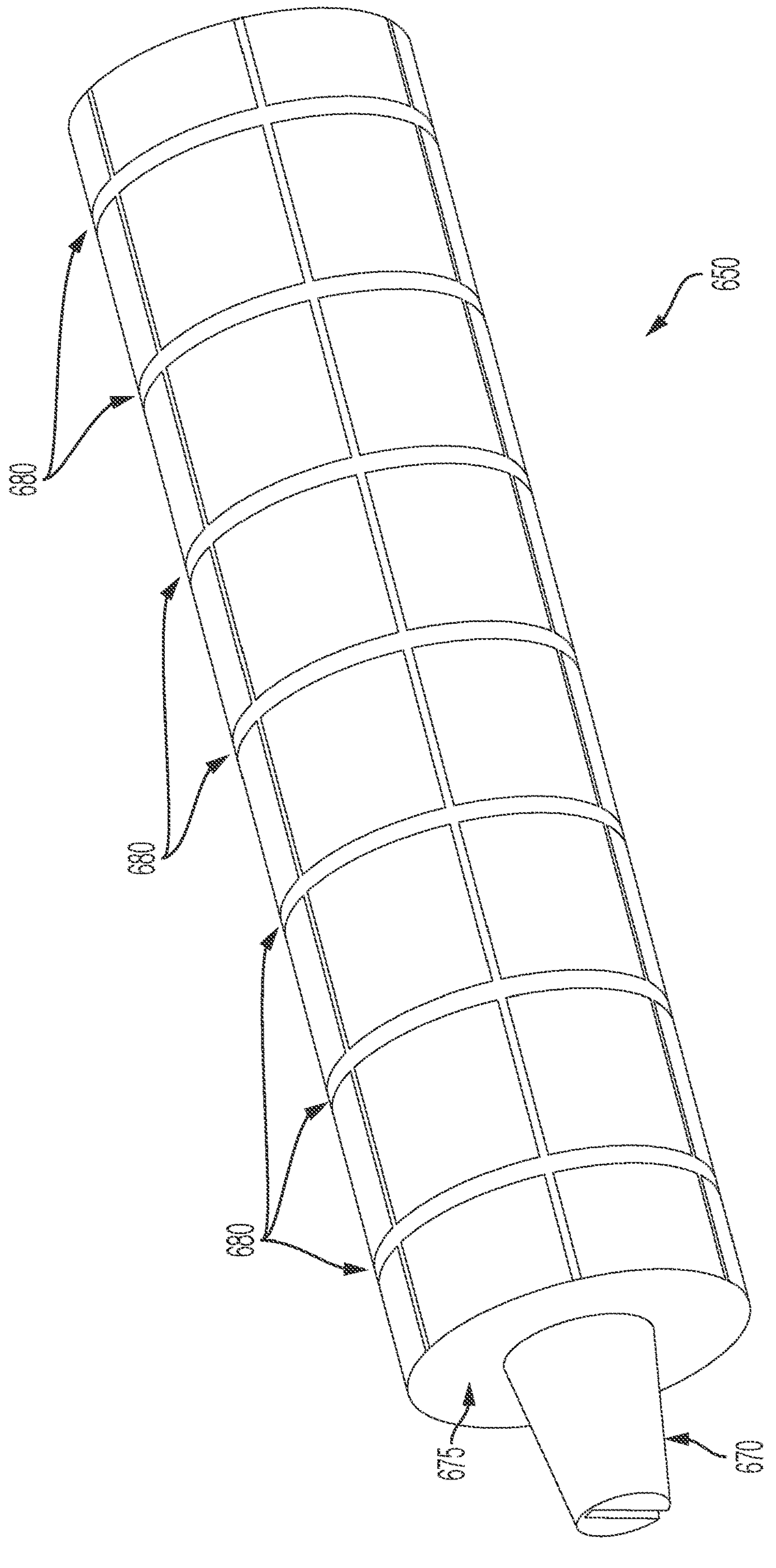
FIG. 6B illustrates a low band dipole arm of the second exemplary low band radiator of FIG. 6A.

FIG. 6B illustrates an exemplary low band dipole arm 650 according to the disclosure. Low band dipole arm 650 is designed to prevent re-radiation in the mid band. Low band dipole arm 650 has a center conductor tube 670, which is surrounded by a mantle 675. Center conductor tube 670 may be a tin-plated aluminum tube. Mantle 675 may be formed of a dielectric material, such as Teflon, or Delrin 100AF, although other materials with similar dielectric properties may be used. Disposed on the outer surface of mantle 675 is a conductive pattern 680. Conductive pattern 680 may have dimensions and features that make the dipole arm 650 transparent to mid band RF energy radiated by the mid band radiators 110 whereby mid band RF energy percolates through the mantle 675 and radiates outward according to the corresponding to the mid band radiator's 110 gain pattern, substantially undisturbed by the presence of low band dipole arm 650. In other words, the presence of conductive pattern 680 renders low band dipole arm 650 effectively transparent to mid band RF energy. Further, low band dipole arm 650 has a broken peripheral current patch, which means that there is not a single straight conductive path along the outer edges of low band dipole arm 650.

Figure 6D:
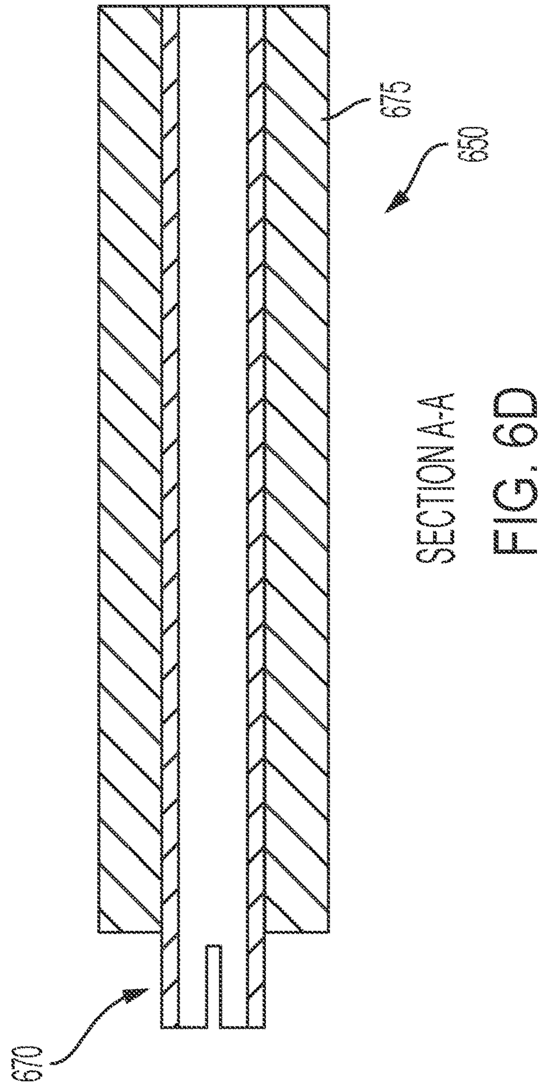
FIGS. 6C, 6D, and 6E provide exemplary dimensions for the low band dipole arm illustrated in FIG. 6B.
Figure 6C:
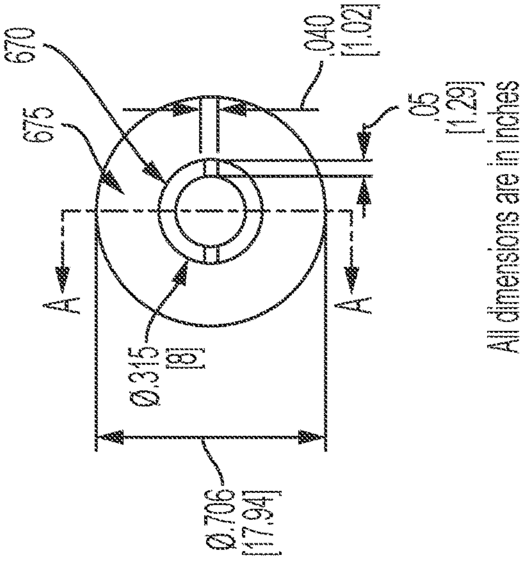
Figure 6E:
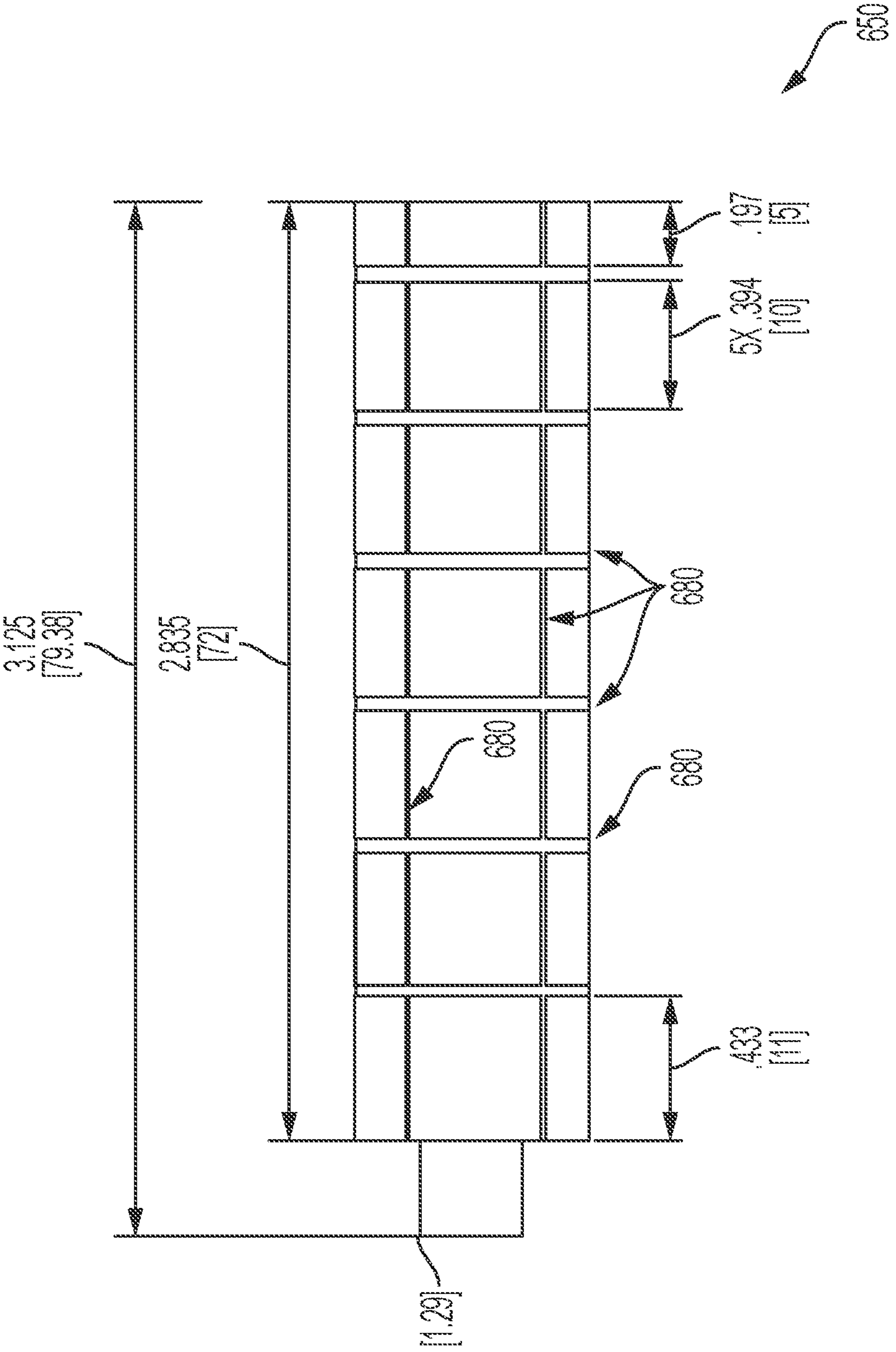

FIGS. 6C, 6D, and 6E provide exemplary dimensions (in inches) for low band dipole arm 650.

Figure 7A:
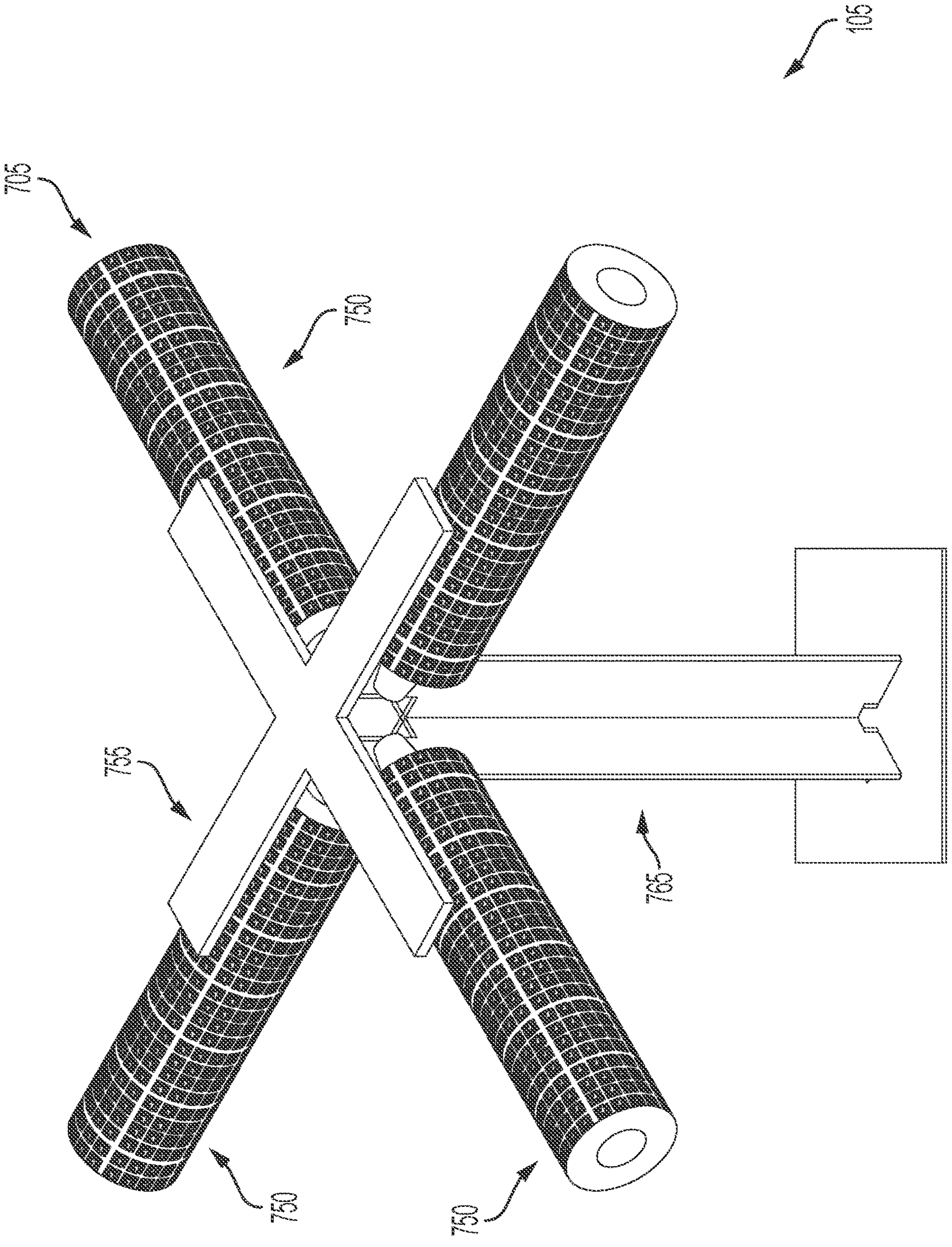
FIG. 7A illustrates a third exemplary low band radiator, which is configured for cloaking C-Band RF energy, according to the disclosure.

FIG. 7A illustrates an exemplar low band radiator 705, which may be used as a low band radiator 105 in array face 100/400 for those low band radiators 105 that are in close proximity to the C-Band radiators 115. In other words, low band radiator 705 has a cloaking structure that is optimized for preventing re-radiation in the C-Band frequencies. Low band radiator 705 has a plurality of dipole arms 750, which are coupled to a balun stem 765. Low band radiator 705 may have a passive radiator 755, which can be used to adjust the bandwidth of low band radiator 705 and adjust its directivity.

Figure 7B:
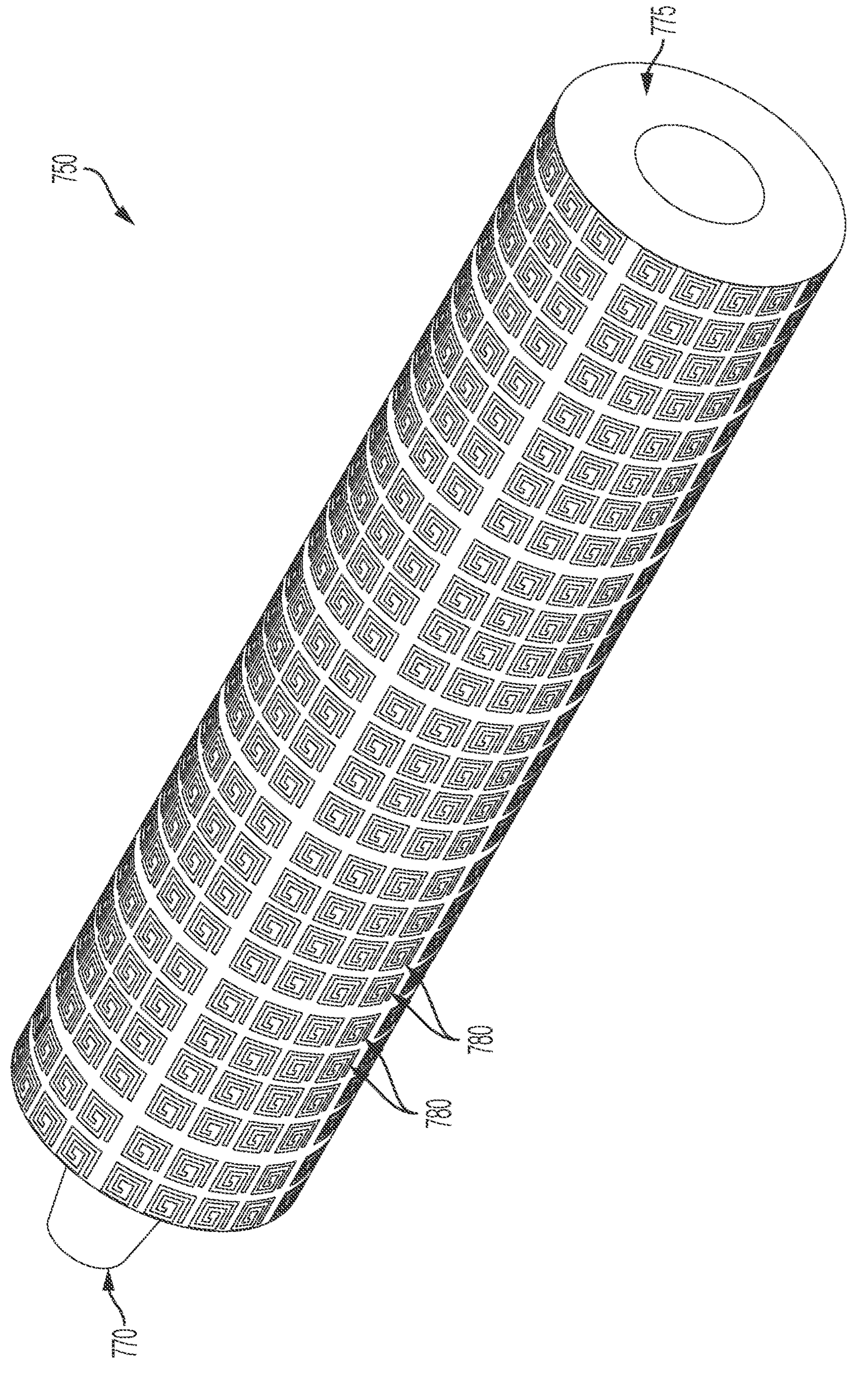
FIG. 7B illustrates a low band dipole arm of the third exemplary low band radiator of FIG. 7A.

FIG. 7B illustrates an exemplary low band dipole arm 750, which is designed to prevent re-radiation in the C-Band. Low band dipole arm 750 has a center conducting rod 770, which is surrounded by a mantle 775. The center conducting rod 770 and mantle 775 may be substantially similar to the corresponding components of low band dipole 650. Disposed on the outer surface of mantle 775 is a conductive pattern, which may comprise a plurality of conductive swirl patterns 780. The presence of the conductive swirl patterns 780 on the outer surface of mantle 775 inhibits re-radiation of C-Band radiation in low band dipole arm 750 such that C-Band RF energy emitted by nearby C-Band radiators 115 effectively percolates through the mantle 775 and continues substantially undisturbed according to its gain pattern.

What is claimed is:

1. A dipole, comprising:

four identical dipole arms arranged in a cross pattern, whereby each of the four dipole arms is formed of a single piece of metal, whereby the four dipole arms have a first dipole arm pair arranged opposite each other, and a second dipole arm pair arranged opposite each other, whereby the first dipole arm pair are configured to radiate a first RF (Radio Frequency) signal and the second dipole arm pair are configured to radiate a second RF signal, wherein each of the dipole arms comprises a plurality of alternating capacitive choke segments and inductive choke segments, wherein each capacitive choke segment comprises a closed oval;

a first balun stem plate that is mechanically and electrically coupled to the first dipole arm pair; and a second balun stem plate that is mechanically and electrically coupled to the second dipole arm pair, wherein the first balun stem plate and the second balun stem plate are mechanically coupled in a cross pattern.

2. The dipole of claim 1, wherein each of the dipole arms do not have a continuous conductive trace running along its length.

3. The dipole of claim 1, wherein each dipole arm comprises four capacitive choke segments.

4. The dipole of claim 1, further comprising a passive radiator disposed above the four dipole arms.

5. The dipole of claim 4, wherein the passive radiator comprises a cross pattern.

6. The dipole of claim 1, wherein each of the four dipole arms comprises a structure that is stamped from a single piece of sheet metal.

7. The dipole of claim 1, wherein each of the dipole arms is mechanically coupled to a PCB (Printed Circuit Board).

8. The dipole of claim 1, further comprising a passive support structure on which the four identical dipole arms are mechanically coupled.

* * * * *